United States Patent Office 3,287,376
Patented Nov. 22, 1966

3,287,376
CHLORO ORGANO POLY(SULFONAZIDE)S
Norman R. Newburg, Wilmington, Del., assignor to Hercules Incorporated, a corporation of Delaware
No Drawing. Filed Oct. 15, 1962, Ser. No. 230,724
4 Claims. (Cl. 260—349)

This invention relates to a new type of sulfonazide and, more particularly, to chlorinated aliphatic poly(sulfonylazide)s.

It is well known that sulfonazides may be prepared by the reaction of a sulfonyl chloride with an alkali metal azide or by reacting a sulfonyl hydrazine with nitrous acid. These compounds are useful intermediates in the synthesis of other organic compounds. Certain groups of these compounds, i.e., the poly(sulfonazide)s, have recently been found to be excellent cross-linking agents for stereoregular polypropylene.

Now in accordance with this invention, a new class of poly(sulfonazide)s has been discovered that is not only useful as a cross-linking agent for polyolefins generally but that is at the same time a flame-proofing agent. The new poly(sulfonazide)s of this invention can be defined as chlorinated aliphatic or cycloaliphatic poly(sulfonylazide)s having the general formula $R(Cl)_x(SO_2N_3)_y$ where R is an aliphatic or cycloaliphatic radical containing at least 5 carbon atoms, $x$ is at least one and $y$ is at least 2.

Exemplary of these new poly(sulfonazide)s are dichlorodecane bis(sulfonylazide), heptachlorooctadecane tris(sulfonylazide), chlorocyclohexane bis(sulfonylazide), poly(sulfonylazide)s of chlorosulfonated mineral oil, paraffin wax, polyethylene, polypropylene, copolymers of ethylene and propylene, etc. The new compounds of this invention will contain from 2 to 200 sulfonylazide groups per molecule and from one chlorine atom per molecule up to a content of about 75% chlorine.

The new chlorinated polysulfonylazide)s of this invention are obtained by chlorosulfonating an aliphatic or cycloaliphatic hydrocarbon, or mixture of said hydrocarbons, and then reacting the chlorosulfonated hydrocarbon with an alkali metal azide. In this reaction it is the chlorine of the sulfonyl chloride groups that reacts first with the alkali metal azide rather than the chlorine attached to the carbon chain; and, hence, the poly(sulfonylazide) is produced.

Any saturated or unsaturated aliphatic hydrocarbon having at least 5 carbon atoms can be chlorinated and chlorosulfinated and then reacted with an alkali metal azide to produce the new chlorinated poly(sulfonazide)s of this invention. The chlorination and chlorosulfonation reactions may be carried out by any of the well-known processes used for this reaction. The simplest procedure is to pass chlorine and sulfur dioxide into a liquid hydrocarbon (solution or molten in the case of solid hydrocarbons) in the presence of ultraviolet light until the desired degree of chlorination and sulfochlorination has been obtained. The chlorinated sulfochlorinated intermediate can also be obtained by chlorination of a poly(sulfonyl chloride), etc.

Exemplary of the aliphatic and cycloaliphatic hydrocarbons that can be chlorinated and sulfochlorinated and then reacted with an azide to produce the new products of this invention are branched and straight chain aliphatic and alicyclic hydrocarbons such as pentane, hexane, cyclohexane, heptane, octane, isooctane, decane, undecane, hexene, cyclohexene, octene, decene, octadecane, naphthenes, mineral oil, and other hydrocarbon oils containing from 5 to 30 or more carbon atoms, paraffin waxes, polyethylene, polypropylene, polyisobutylene, copolymers of ethylene and propylene, etc., and mixtures of any of these hydrocarbons. Of particular value as cross-linking agents for polypropylene is the chloro polysulfonazide produced from hydrocarbons having from 10 to 15 carbon atoms per molecule.

The amount of chloro and sulfochloro groups introduced in to the hydrocarbon can be varied over a wide range but should be sufficient to provide an average of at least one chloro and 2 sulfochloro groups per molecule.

The new chlorinated aliphatic and cycloaliphatic poly(sulfonylazide)s of this invention are outstanding cross-linking agents for polyolefins and particularly for polypropylene, which is, as is well known to those skilled in the art, difficult to cross-link without polymer degradation. Because of their thermal stability, the high processing temperatures required for high melting polymers such as polypropylene, may be used without premature cross-linking. This makes them particularly useful in the preparation of cross-linked polypropylene foams, being effective as cross-linking agents at approximately the same temperature as the chemical blowing agents decompose and, hence, enabling the simultaneous blowing and cross-linking of polypropylene. Another outstanding property of these new chlorinated poly(sulfonylazide)s is that they can function as both cross-linking agent and flame-proofing agents, particularly in the case of the more highly chlorinated poly(sulfonylazide)s. This is of particular advantage since the flame-proofing agent is attached to the polymer and avoids the exudation of the flame-proofing agent which is often a problem with other such agents.

The following examples will illustrate the preparation of the chlorinated aliphatic and cycloaliphatic poly(sulfonylazide)s of this invention. All parts and percentages are by weight unless otherwise indicated.

EXAMPLE 1

A solution of 42 g. of a paraffin wax (M.P. 64° C.) in 400 ml. ethylene dichloride was heated to 45° C. while irradiating with a 100-watt incandescent lamp and passing in chlorine gas (100 ml. per minute) and sulfur dioxide (200 ml. per minute). The reaction was stopped after 4 hours and the solvent was removed. On analysis this chlorinated sulfochlorinated paraffin wax was found to contain 28.2% chlorine and 14.6% sulfur.

A solution of 62.5 g. of the above chlorosulfonated wax was dissolved in 600 ml. acetone and added dropwise to 65 g. sodium azide dissolved in 150 ml. water. After stirring at room temperature for an hour, the reaction mixture was refluxed for three hours. The acetone was removed, and the product was then extracted with 350 ml. of ethylene dichloride. A total solids on this solution showed that the product amounted to 55 g. An analysis of this product showed that it contained 13% chlorine, 14.7% sulfur, and 19.6% nitrogen.

EXAMPLE 2

A solution of 62.5 parts of a hydrocarbon mixture having a boiling point of 170–200° C. and containing about 20% naphthene and 80% of branched and straight chain hydrocarbons, containing an average of about 11 carbon atoms per molecule, in 600 parts of ethylene dichloride was irradiated with a 100-watt incandescent lamp while passing in chlorine gas at the rate of 150 ml. per minute and sulfur dioxide gas at the rate of 300 ml. per minute for 6.5 hours. The temperature was maintained at 25° C. by cooling during the reaction. The solvent was removed; and on analysis the product was found to contain 34.7% chlorine and 16.3% sulfur.

A portion of the above chlorosulfonated hydrocarbon mixture (120 parts) was dissolved in 1000 parts of acetone, and the solution was then added dropwise to a solution of 83.8 parts of sodium azide in 200 parts of water while maintaining the temperature at 30° C. After stirring for an additional hour at room temperature, the reaction mixture was refluxed for 2.5 hours. The acetone was then removed, and the oil which remained was extracted with 750 parts of ethylene dichloride. Removal of the latter solvent from this solution yielded 113 parts of an amber viscous oil which, on analysis, was found to contain 22.1% nitrogen, 16.7% sulfur and 12.3% chlorine, indicating a ratio of nitrogen to sulfur of 3.02 (calculated value is 3.0).

Samples of polyethylene having a reduced specific viscosity (RSV) of 2.7 as measured on a 0.1% solution in decahydronaphthalene at 135° C. and polypropylene having a RSV of 3.0 as measured on a 0.1% solution in decahydronaphthalene at 135° C. were cross-linked with the above polychloro poly(sulfonazide) as follows: To 100 parts of the polymer in the form of flake in each case was added 1 to 5 parts of the azide in acetone, and then the acetone was removed to leave the sulfonylazide on the dry flake. This flake was then heated at 400° F. in a mold under 800 p.s.i. for 15 minutes. The gel-swell values were then determined (as described below) on the cured polymer with the following results:

Table

| Polymer | Parts Azide | Percent Gel | Percent Swell |
| --- | --- | --- | --- |
| Polyethylene | 1 | 56 | 1,145 |
| Polyethylene | 5 | 68 | 289 |
| Polypropylene | 1 | 68 | 1,660 |
| Polypropylene | 5 | 81 | 600 |

The percent gel and percent swell were determined as follows: a weighed cylindrical sample of polymer weighing about 100 mg. is soaked in an excess of decahydronaphthalene (30 cc.) at 140° C. in a closed container for 16 hours. The sample is then removed, blotted on filter paper without squeezing so as to remove decahydronaphthalene on the surface and weighed at once. The swollen sample is then dried in a current of air at room temperature over a 72-hour period to constant weight. The weights of initial and final sample are corrected for non-polymer content based on knowledge of components. From these figures:

$$\frac{\text{corrected dry weight}}{\text{corrected initial weight}} \times 100 = \text{percent gel}$$

Similarly, percent swell is calculated by the formula:

$$\frac{\text{corrected swollen weight} - \text{corrected dry weight}}{\text{corrected dry weight}} \times 100 = \text{percent swell}$$

EXAMPLE 3

A solution of 21 parts of mineral oil having a boiling point of 672° to 980° F. in 400 parts of carbon tetrachloride was irradiated with a 100-watt incandescent lamp while passing in chlorine at 100 ml. per minute and sulfur dioxide gas at the rate of 200 ml. per minute. The temperature was maintained at 25° C. by cooling during the reaction. After 77 minutes the sulfur dioxide was turned off, and the chlorination was continued for an additional 4 hours. A mixture of carbon tetrachloride soluble and insoluble oils resulted from the reaction. On analysis the soluble oil was found to contain 59.5% chlorine and 4.8% sulfur, and the insoluble oil was found to contain 48.1% chlorine and 10.0% sulfur.

Twenty parts of the insoluble portion of the above chlorosulfonated mineral oil was dissolved in 130 parts of ethylene dichloride and stirred and refluxed with 10 parts of sodium azide dissolved in 25 parts of water for 5 hours. The organic layer was then washed with water, dried, and the ethylene dichloride was removed. The amber resin which remained amounted to 18.5 grams. On analysis this product was found to contain 32.7% chlorine, 10.9% sulfur, and 9.8% nitrogen, indicating the presence of at least 2 sulfonylazide groups per molecule.

EXAMPLE 4

A copolymer of ethylene and propylene having an RSV of 4.0 as measured on a 0.1% solution in decahydronaphthalene at 135° C. and containing 29% propylene which had been chlorosulfonated to a chlorine content of 24.58% and a sulfur content of 1.25% was used in this example. Ten parts of this chlorosulfonated ethylene-propylene copolymer was dissolved in 600 parts of chloroform and 10 parts of sodium azide and 5 parts of dimethylformamide were added. The mixture was stirred at room temperature for 5 days, followed by refluxing for 4 hours. The reaction mixture was then washed with water, and the diluents were evaporated. There was obtained 9.8 parts of a rubbery product. On analysis this product was found to contain 22.4% chlorine, 1.11% sulfur and 0.6% nitrogen.

EXAMPLE 5

A solution of 21 parts of a mineral oil having a boiling point of 672° to 980° F. in 400 parts of carbon tetrachloride was irradiated with an ultraviolet lamp while passing in chlorine gas at the rate of 100 ml. per minute and sulfur dioxide gas at the rate of 100 ml. per minute. The temperature was maintained at 25° C. by cooling during the reaction. After 3.6 hours the sulfur dioxide was turned off and the chlorine was continued for an additional 2.9 hours. The solvent was then removed leaving as a residue a white solid which on analysis was found to contain 3.8% sulfur and 68.6% chlorine.

Twenty parts of this chlorosulfonated mineral oil was dissolved in 80 parts of acetone and the solution was added dropwise to a solution of 15 parts of sodium azide in 40 parts of water. The reaction mixture was stirred for 26 hours at room temperature. The solvent was removed and the residue was extracted with 130 parts of ethylene dichloride. The extract was then washed with water and dried. The resin which remained after removal of the solvent amounted to 18 parts. On analysis it was found to contain 3.9% sulfur, 5.1% nitrogen, and 61.9% chlorine.

A stereoregular polypropylene having an RSV of 2.7 (0.1% solution in decahydronaphthalene at 135° C.) was mixed with 30 parts of the above chloro poly(sulfonylazide) per 100 parts of polymer and cross-linked by heating as described in Examples 1 and 2. When tested for flamability, this cross-linked polypropylene was found to be self-extinguishing when removed from the burner flame.

EXAMPLE 6

Sulfur dioxide (300 ml. of gas per minute) was passed into a solution of 31.2 grams of a commercial mixture of hydrocarbons containing 11 and 12 carbon atoms per molecule in 200 ml. of carbon tetrachloride. After five minutes the mixture was exposed to the light from an ultraviolet lamp three inches from the reactor, and chlorine was passed in at the rate of 77 ml. per minute. The combined gases were passed in for 223 minutes while holding the temperature at 25° C. After turning off the light and the gases, the solvent was removed under vacuum whereby there was obtained a viscous oil which, on analysis, was found to contain 16.6% of sulfur and 29.2% of chlorine. To a solution of 11.2 g. of this chlorosulfonated hydrocarbon in 150 ml. of acetone was added dropwise a solution of 7.8 g. of sodium azide in 25 ml. of water while stirring with a magnetic stirrer. After stirring for one hour at room temperature, the reaction mixture was heated at 60° C. for 3 hours. Stirring was continued for 16 hours at room temperature, after which the solvent was removed and the resulting mixture was diluted with 150 ml. of chloroform. The solution so obtained was washed with water and dried. On removing the diluent there was obtained 9.7 g. of an amber viscous oil which, on analysis, was found to contain 5.4 milliequivalents of azide per gram and 11.7% chlorine.

An expandable polypropylene composition was prepared by blending 100 parts of stereoregular polypropylene having an RSV of 3.1, with 0.25 part of the above chloro poly(sulfonazide) and 3.0 parts of azobis(formamide) as blowing agent. This composition was molded to an unblown preform 0.188 inch thick. The preform was placed in a heated mold (having a base fastened to it which permitted pressure to be exerted on the preform through the plunger) with the plunger resting on the preform, and the entire assembly was placed in a press heated at 232° C. under pressure for 3 minutes. The press was then opened rapidly permitting correspondingly rapid expansion of the preform. After expansion the mold was held at 232° C. for an additional 2 minutes so that cross-linking was completed, and then it was cooled. The resulting cross-linked polypropylene foam had a density of approximately 7 lbs./cu. ft. and a structure of extremely uniform closed cells averaging in size 15 microns in length and 5 microns in width.

What I claim and desire to protect by Letters Patent is:

1. A chlorinated poly(sulfonazide) having the general formula $$R(Cl)_x(SO_2N_3)_y$$

where R is an organic radical selected from the group consisting of aliphatic and cycloaliphatic radicals and containing at least 5 carbon atoms and $x$ is an integer of at least 1 and $y$ is an integer of at least 2.

2. The product of claim 1 wherein the chlorinated poly(sulfonazide) is a chlorinated aliphatic poly(sulfonazide) containing at least 5 carbon atoms, from 2 to 200 sulfonazide groups, and from one chlorine per molecule up to 75% by weight of chlorine.

3. The product of claim 1 wherein the chlorinated poly(sulfonazide) is a chloro aliphatic poly(sulfonazide) containing from 10 to 15 carbon atoms, at least one chlorine atom and at least two sulfonazide groups per molecule.

4. The process of preparing a chloro poly(sulfonazide) having the general formula $$R(Cl)_x(SO_2N_3)_y$$

where R is an organic radical selected from the group consisting of aliphatic and cycloaliphatic radicals and containing at least 5 carbon atoms and $x$ is an integer of at least 1 and $y$ is an integer of at least 2, which comprises passing chlorine and sulfur dioxide into a solution, in a chlorinated aliphatic hydrocarbon, of a mixture of aliphatic and cycloaliphatic hydrocarbons in the presence of ultraviolet light for a period of time sufficient to introduce into said hydrocarbons at least one chlorine and two sulfochloro groups per molecule of said hydrocarbons, and reacting a solution of the product in a solvent selected from acetone and chlorinated aliphatic hydrocarbons with an alkali metal azide to convert the sulfochloro groups to sulfonazide groups.

References Cited by the Examiner

Pegolotti et al., J.A.C.S., 83 (1961) pp. 3258–3262 (copy in Scientific Library).

JOSEPH L. SCHOFER, *Primary Examiner.*

JAMES A. SEIDLECK, *Examiner.*

H. WONG, *Assistant Examiner.*